Jan. 25, 1944.     E. A. HAGY     2,339,991
VISCOSITY MEASURING APPARATUS
Filed Nov. 13, 1941     3 Sheets-Sheet 1

INVENTOR.
ERNEST A. HAGY

Jan. 25, 1944.                     E. A. HAGY                        2,339,991
                        VISCOSITY MEASURING APPARATUS
                          Filed Nov. 13, 1941           3 Sheets-Sheet 2

INVENTOR.
ERNEST A. HAGY
BY
Zugelter & Zugelter
ATTORNEYS.

Jan. 25, 1944.  E. A. HAGY  2,339,991
VISCOSITY MEASURING APPARATUS
Filed Nov. 13, 1941  3 Sheets-Sheet 3

INVENTOR
ERNEST A. HAGY
BY Zugelter & Zugelter
ATTORNEYS.

Patented Jan. 25, 1944

2,339,991

UNITED STATES PATENT OFFICE 2,339,991

VISCOSITY MEASURING APPARATUS

Ernest A. Hagy, San Antonio, Tex.

Application November 13, 1941, Serial No. 419,010

20 Claims. (Cl. 265—11)

This invention relates to improvements in method and apparatus for indicating or recording the wetness or stiffness of plastic semi-solid substances, and may include means for maintaining a predetermined consistency of the mass.

An object of the invention is to provide means for indicating or recording the liquid-solid ratio of the mass without interruption of operations being carried on in connection with the mixing, transporting or other operations being performed by, or upon, the mass.

Another object of the invention is the provision of means for maintaining a constant liquid-solid ratio in the mass being used.

Another object is to provide simple, durable and effective means for the accomplishment of the preceding objects, including novel features of engineering design which will become apparent as the description proceeds.

It is to be understood that this invention pertains to means for testing, recording and governing the wetness and stiffness of all semi-solid plastics or substances.

In the following description, the invention is by way of example disclosed as used in connection with a mass in transit through a sluice or other conduit, and the means of accomplishing the foregoing objects are illustrated in the accompanying drawings, in which.

Figures 1, 2:
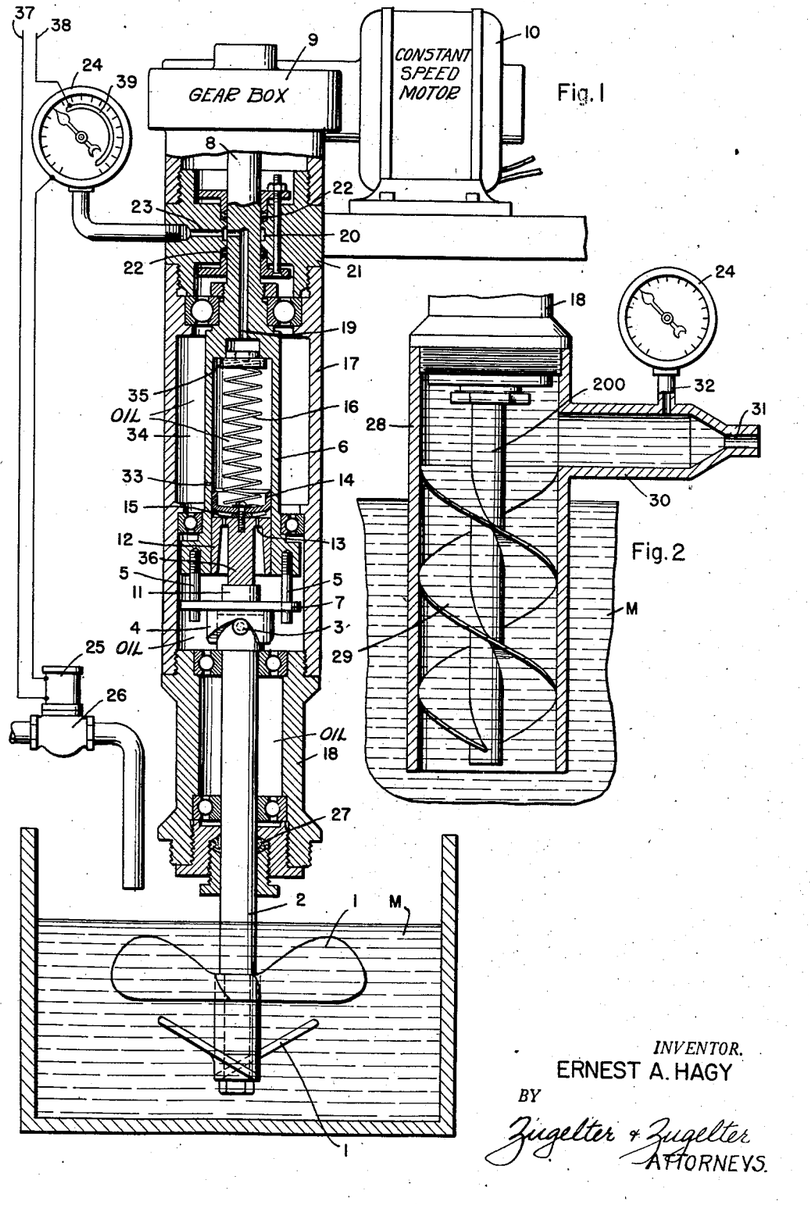
Fig. 1 is a vertical sectional view, partly in elevation, showing means whereby the torque required to rotate a plurality of blades in shearing relation to the mass is converted into fluid pressure for indicating and/or governing the moisture content of the mass.
Fig. 2 is a fragmental vertical sectional view, partly in elevation, showing an alternative means for indicating the wetness or stiffness of the mass.

Attention is here invited to Fig. 1 which illustrates the mechanical means employed for driving a plurality of blades 1 with shearing relation to the mass. The mass M in this instance is flowing through a sluice so that varying degrees of liquid-solid content of the flowing mass will offer a variable resistance to the rotation of the blades 1. The blades 1 are fixedly mounted on the shaft 2, which shaft is driven by means of rollers 3 that engage the cam 4. The cam is arranged for sliding engagement with the upper end of the shaft 2, and may be driven by suitable means such as a plurality of pins 5 projecting from the lower end of a rotatable cylinder 6. It will be noted that the pins 5 are adapted to slide through apertures in the flange 7 of the cam 4, to permit axial movement thereof. The upper end of the cylinder 6 is provided with an extending shaft 8 which is driven at constant speed from the reducing gear 9 associated with the constant speed motor 10.

The direction of the blades 1 is counter-clockwise, as viewed from above. Obviously, resistance of the mass to the rotation of the blades 1 will be transmitted to the rollers 3 which, acting upon the cam 4, will tend to produce an upward movement of the cam 4 the force of which is proportional to the torque of the shaft 2. A projection 11 on the upper face of the cam 4 is in abutting relationship with the lower end 36 of a piston 12 mounted for reciprocal movement in the cylinder 6. The upper face of the piston 12 is provided with several small ports 13 to permit passage of fluid from the under side of the piston past a hydraulic cup 14, the cup 14 being normally held from actual engagement with the upper face of the piston 12 by the action of a disc spring 15, to keep the ports 13 always open. The cam 4 and the piston 12 are normally yieldingly held in their lowermost position, preferably by means of a compression spring 16 which abuts at its upper end against the shoulder 35 of a reduced portion of the cylinder 6. Thus, it is apparent that the spring 16 will tend to hold the piston and cam in their lowermost positions while the rollers 3 exert an upward force on the cam 4 proportional to the torque being transmitted by the shaft 2.

It may be explained here that the interiors of the cylinder 6 and the housings 17 and 18 are filled with a dense liquid, the cylinder 6 being entirely filled at all times. Thus, upward movement of the cam 4 and the piston 12 will create a pressure in the cylinder 6 which is transmitted through the passage 19 to an annular groove 20 formed interiorly of the central vertical bore of the head 21 and located between the packings 22—22. A passage 23 establishes communication between the groove 20 and a suitable pressure indicator or gauge 24. A recording instrument might readily be used in place of the gauge, as is obvious. Since the upward thrust exerted by the rollers 3 on the cam 4, and the pressure created inside the cylinder 6, are directly proportional to the resistance offered to the rotation of the blades 1, it follows that the reading of the gauge, or recording instrument 24, will be proportional to the resistance offered to the rotation of the blades. Thus, a visible indication of the liquid-solid content of the mass is obtained.

The character 33 indicates a small port through which liquid may pass from the chamber 34 to the interior of cylinder 6 when cup 14 is in its lowermost position, for maintaining a filled condition of the cylinder at all times.

When an automatic control of the liquid-solid content of the mass is desired, the gauge or recording instrument 24 may be connected by means of an electrical circuit 37—38 with a solenoid 25 for actuating a valve 26 which, when the resistance of the mass to the rotation of the blades 1 reaches a predetermined high point, will cause the solenoid 25 to open the valve 26 and admit more liquid to the mass; and when the resistance of the mass to the rotation of the blades declines to a certain point, contact 39 swept by the gauge pointer will break the circuit to the solenoid and close the valve 26 against the admission of further liquid. While the discharge line from the valve 26 is here shown leading to the sluice proximate the position of the blades 1 it is to be understood that in practice the valve 26 and the liquid discharge line would preferably admit the liquid to the mass at a substantial distance from the blades and prior to the entrance of the mass into a mixing chamber, or other means of agitating the mass.

Ball, or roller bearings, may be provided for the rotating cylinder 6 and the shaft 2, and the rollers 3 engaging the cam 4 may be mounted on needle bearings in order to reduce friction and thereby secure a highly sensitive recording or control of the liquid-solid ratio of the mass. Suitable packing 27 is provided at the lower end of the housing 18 to prevent the leakage of liquid from the interior thereof.

Fig. 2 illustrates an alternative means of recording the wetness or stiffness of the mass. In this construction the mechanical operation above the housing 18 may be similar to that shown in Fig. 1. However, in this instance, a cylindrical casing 28 is attached to the lower end of the housing 18, the lower end of this casing being immersed in the mass. Attached to the shaft 200 and fitting closely within the casing 28 is a helical lift member 29 which upon rotation serves to lift a portion of the mass to the upper part of the casing 28. Proximate the upper end of the casing 28 is a conduit or pocket 30 leading to a reduced tube, or orifice, 31. In communication with the interior of the conduit or pocket 30 and located between the casing 28 and the tube or orifice 31, is a tube 32 leading to a pressure gauge or recording instrument 24 which may be similar to the one shown and described in Fig. 1.

In the Fig. 2 construction described in the preceding paragraph, the recording is governed by the pressure required to force the mass through the tube or orifice 31. Since the shaft 200 rotates at a constant speed, a mass that is low in moisture or high in stiffness will require a greater pressure for discharge through the tube or orifice 31. Conversely, a mass that is high in liquid content will require less pressure for discharge through the tube or orifice. If desired, the gauge or recording instrument here shown at 24 may be removed, and replaced by the arrangement shown in Fig. 1, in which event the apparatus will correspond to the disclosure of Fig. 3, wherein the torque transmitted by the shaft 200 governs the operation of the gauge or recording instrument.

Figures 3, 4:
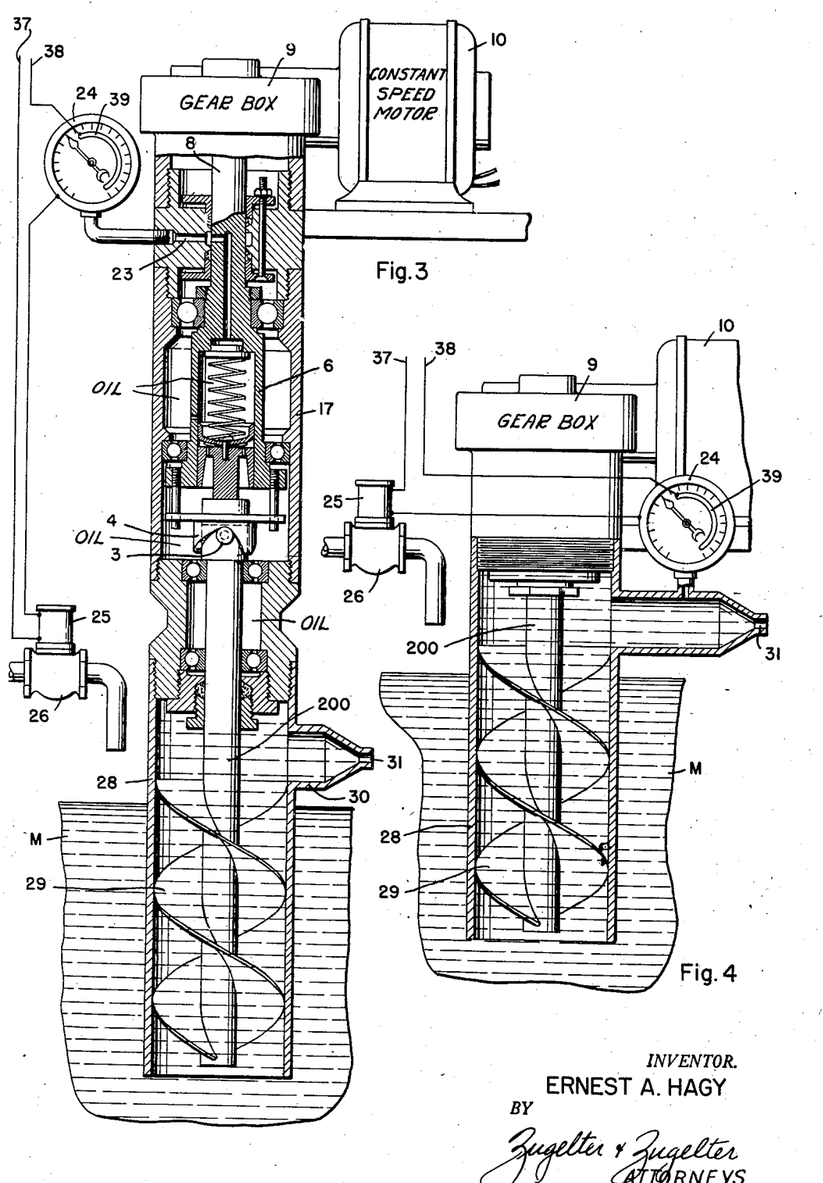
Fig. 3 is a vertical sectional view of a modification of the Fig. 1 structure, combining some of the features of Fig. 2.
Fig. 4 is a fragmental vertical section showing a modification of the Fig. 2 device.

The gauge or recording instrument, as shown in Fig. 4, may also be connected with a solenoid 25 for actuating a valve 26 to govern the amount of liquid admitted to the mass and in this case the pressure of the mass in the conduit 30 would govern the operation of the valve 26. Where it is desired to govern the recording by the torque transmitted by the shaft 200, then the gauge and valve arrangement would be substantially as shown in Figs. 1 or 3. In this form of the device, the shaft 200 is driven directly and positively from the reduction gearing in the case 9, that is, without the interposition of a cam and roller such as characterizes the Fig. 3 drive. As in the other drawing views, the indicator hand of the gauge contacts an electrical contactor 39 adapted to close the solenoid circuit whenever the hand passes over said contactor. The segment, of course, is insulated from the gauge case, as any electrician will appreciate, and it should be here understood that any other suitable form of contact means capable of the functions ascribed to the means herein disclosed, may be substituted therefor. Increase of pressure in the gauge rotates the hand clockwise.

From the foregoing, it should be understood that the invention is applicable to the testing and control of practically any semi-solid plastic or substance, of which certain characteristics should be predetermined for securing maximum good results in processing. By way of example, the apparatus of the invention may be used to measure and control: (1) viscosity; (2) water content; and (3) pumpability, of drilling muds for oil wells, slurry for cement plants, cement paste for oil well cementing, and slip and glazes for the ceramic industries. Various other applications will suggest themselves to persons conversant with the related arts, as is obvious. As another application which is exemplary of many others, the invention lends itself for use in extruding processes of various kinds. For example, the invention contemplates use of the devices of Figs. 2, 3 and 4, as extrusion machines for delivery of plastic substances through orifices such as 31 suitably shaped and proportioned to deliver ribbons or bars of formed material. For instance, in any of Figs. 2, 3 and 4, the orifices 31 may be so shaped and proportioned as to function as dies in the manufacture of bricks, tiles, and the like. When the plastic mass is very stiff, the apparatus used as an extrusion machine will preferably operate on the principle inherent in the Fig. 3 device, wherein the torque is measured through the medium of a non-compressible liquid that enters or actuates the gauge or measuring instrument 24. Considering the devices herein disclosed as pug mills for moving a plastic mass through dies or forming orifices, the present invention in its broadest aspect consists in measuring the torque required to drive a pug mill or other extrusion apparatus, for the determination and/or control of the liquid-solid ratio of the mass, or its wetness or stiffness characteristic.

From the foregoing description it is apparent that this apparatus is ideal for indicating or recording, and controlling the liquid content of plastic semi-solids during processing. Many industries employ liquid-solid substances in an infinite number of processes and require that these substances shall meet certain predetermined requirements as to liquid content and viscosity. Heretofore it has been the practice to test the substance at intervals by taking a laboratory sample from the substance. However, this is a costly time-consuming operation which is furthermore subject to error of the human element. With a device of the character described the condition of the substance is visually indicated at all times, and if desired the liquid admitted to the substance may be automatically governed to secure the correct liquid ratio in the mass at all times, without the need of manual labor.

Figure 5:
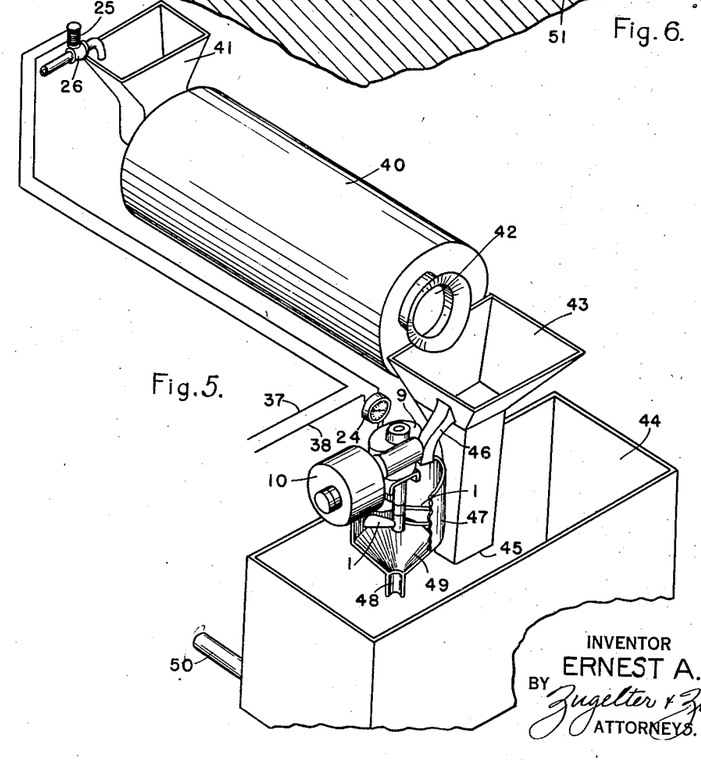
Figs. 5 and 6 are perspective views showing, respectively, a cement plant installation and a well drilling arrangement embodying the invention.

The perspective view of Fig. 5 shows an improved apparatus adapted for use in one stage of the manufacture of cement, and in which the character 40 indicates a rotary ball mill having at one end a feed hopper 41 through which a plastic mass is introduced into the mill. After thorough grinding and mixing, the mass leaves the mill through the discharge port 42 and drops into a chute or funnel 43 which leads to a suitable vat or other container 44. The funnel is open at its lower end 45, but it so restricts the flow of the mass as to cause a portion of it to enter a by-pass or spout 46 mounted at one side of the funnel. The flow of the mass, if continuous from the ball mill to the funnel, will be continuous also through the by-pass 46.

A stationary receptacle 47 having an open top and an orifice 48 in its bottom 49, is mounted to receive the proportionate amount of plastic that leaves the funnel through the by-pass 46. This receptacle is sufficiently large in diameter to accommodate the rotating shearing members 1 of an apparatus such as Fig. 1 discloses, or to accommodate the screw element of Figs. 2, 3 or 4. Thus, when the motor 10 is in operation to rotate the shear member, or the screw, in a proper direction the plastic mass within the receptacle 47 will be forced through the orifice 48. In the manner heretofore explained in connection with Figs. 1 to 4, a reading will be obtained from the gauge 24 indicating the wetness or stiffness of the plastic mass shunted into the receptacle through the by-pass. The gauge 24, being electrically connected with the water valve through the medium or solenoid 25, will control the addition of water at the hopper 41 as explained previously in connection with Figs. 1, 3 and 4. Accordingly, the plastic mass entering the vat or container 44, will be automatically maintained at a desired consistency. Through a pipe indicated at 50, the mass may be directed from the vat or container 44 to a suitable storage tank or other destination, a pump being customarily employed for this purpose.

Further explaining the apparatus of Fig. 5, it should be observed that any of the various forms of the measuring instrument hereinbefore described, might obviously be substituted for the modified instrument illustrated by Fig. 5. That is, the instruments of Figs. 1, 2, 3 and 4, with or without the automatic control for the water supply, are well adapted for use in the Fig. 5 combination.

Figure 6:
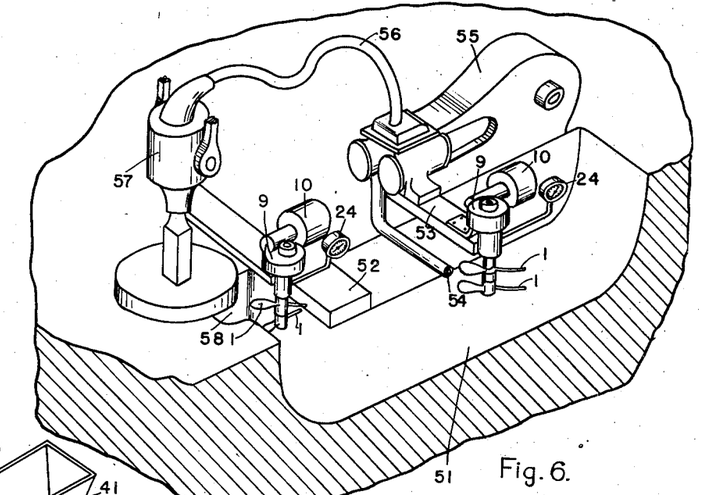

Fig. 6 is illustrative of an improved apparatus for use in the drilling of wells in the earth, and whereby is achieved a continuous gauging or recording of the drilling fluid characteristics. In the art of well drilling, a hollow drill stem is employed to enable the introduction of drilling mud or fluid to the bit of the drill. The nature of this mud or fluid is a matter of primary importance in the drilling process. For example, in the drilling of wells wherein high gas pressures are encountered, the fluid must have sufficient density to provide a hydrostatic pressure in the hole to counteract the gas pressures. If the density of the fluid is too low, the well may blow in and run wild. Viscosity also is an important characteristic of the drilling fluid in the sealing of porous strata and in the prevention of caving of the walls of the well where loose strata, such as shale or sand, are encountered. The degree of viscosity and density of the drilling fluid, however, must be kept within certain limits so as not to interfere with its pumpability, since in practice the fluid is pumped under pressure through the hollow stem of the drill, down to the bit thereof.

In order to ensure the proper characteristics of the drilling mud or fluid at all times, and without danger of errors attributable to human intervention, one or more measuring instruments as indicated at 9—10 and 9—10 of Fig. 6 might be incorporated in the apparatus. These instruments, while illustrated to correspond with the Fig. 1 type, might as well be of the alternative type disclosed by Figs. 2, 3 or 4. The character 51 indicates a pit to be kept charged with the drilling fluid, and over the pit the measuring instruments 9—10 and 9—10 may be supported in any suitable manner, such as upon planks or other appropriate supports 52 and 53, with the shearing members of the instruments immersed in the fluid of the pit.

In the embodiment shown, one of the measuring instruments is located adjacent to the inlet or suction pipe 54 of a pump 55 which delivers the drilling fluid through a flexible hose 56 to the swivel 57 at the upper end of the drill stem. The fluid entering the swivel passes under pressure to the lower end of the drill stem and emerges from the bit, where it picks up the cuttings and delivers them upwardly about the drill stem to the top of the well hole. The fluid and cuttings may in some instances discharge into the pit inlet at 58, while in other installations the fluid and cuttings may discharge into a trough or conduit leading from the top of the well hole to a remote point, or dump. When by an arrangement such as Fig. 6, the mixed fluid and drill cuttings are directed into the pit at the location 58, a complete measuring instrument may be stationed at such location for measuring the wetness or stiffness of the drilling fluid after it has circulated through the well, and from the comparative readings obtained from the two instruments the operator may learn various facts concerning the conditions existing within the well as the drilling progresses. Moreover, the instrument making the measurements at 58 will indicate whether or not additional water or solid matter is required at that point to maintain a desired and proper indication upon the other instrument at the intake 54.

It is to be understood that one or the other of the measuring instruments included in the Fig. 6 disclosure may be omitted, if desired. The use of but one instrument in the Fig. 6 combination is especially feasible when the mixed fluid and cuttings from the well are directed to a remote dump, rather than returned to the pit. It may be noted that closing the top of the pit in Fig. 6 will not alter the functioning of the measuring instrument, or instruments. Similarly, the sluice or conduit containing the mass M in Fig. 1, for example, may be either open-topped or totally closed without in any manner affecting the proper operation of the measuring instrument in its various alternative forms.

What is claimed is:

1. Apparatus of the character described, comprising a screw adapted to be immersed in a fluid under test, means for rotating the screw, a housing in which the screw rotates for advancing the material under test, said housing having an open end immersed in the mass, and a constricted orifice formed therein to release the material advanced by the screw, and an indicator responsive to the torque required to rotate the screw under conditions of varying stiffness of the material, whereby characteristics of the material are rendered observable continuously and automatically.

2. Apparatus for testing a flowing mass of semi-solid plastic substance, comprising in combination a confining housing having an open end immersed in the flowing mass to isolate therefrom a small portion of the semi-solid plastic substance, and means operative within the housing for advancing the plastic substance into the housing, the housing having a constricted orifice therein remote from the open end of the housing for extrusion of the plastic substance from the housing by the force of the advancing means, and an indicator responsive to variations in the extrusion pressure occurring in the housing, for indicating the stiffness characteristic of the plastic substance.

3. Apparatus for testing a flowing mass of semi-solid plastic substance, comprising in combination a confining housing having an open end immersed in the flowing mass to isolate therefrom a small portion of the semi-solid plastic substance, and means operative within the housing for advancing the plastic substance into the housing, the housing having a constricted orifice therein for extrusion of the plastic substance from the housing by the force of the advancing means, and an indicator responsive to variations in the power requirements of the advancing means, for indicating the stiffness characteristic of the plastic substance.

4. Apparatus for the continuous testing of a flowing mass of semi-solid plastic substance moving along a conveying means, said apparatus comprising, a confining housing having an open lower end immersed in the flowing mass to continuously withdraw therefrom only small portions from the whole of said flowing mass, means operative within the housing for lifting the withdrawn portion of the plastic substance from the conveyer means into the housing, the housing having a constricted orifice therein near its closed upper end for extrusion of the plastic substance from the housing by the force of the lifting means, said orifice being adapted to discharge into the conveying means for the flowing mass, and an indicator responsive to variations in the extrusion pressure occurring in the housing, for indicating the stiffness characteristic of the plastic substance.

5. Apparatus for the continuous testing of a semi-solid plastic substance flowing in a sluice or the like, said apparatus comprising, a confining housing having an open lower end immersed in the flowing mass, means operative within the housing for lifting continuously from the whole of the mass some portion of the substance and forcing it into the housing, the housing having a constricted orifice therein for extrusion of the substance from the housing by the force of the lifting means, said orifice discharging into the sluice above the level of substance flowing therein, and an indicator responsive to variations in the power requirements of the lifting means, for indicating the stiffness characteristic of the plastic substance.

6. Apparatus for indicating the wetness or stiffness of plastic semi-solid substance, comprising the combination of an elongated fluid-filled hollow housing having axial bearing means at its upper and lower ends, and an intermediate bearing within the housing, a rotatable driven shaft journalled in the lower bearing means and depending from the lower end of the housng, means near the lower end of said driven shaft for immersion in the plastic substance to offer resistance to rotation of said shaft, a hollow fluid-filled cylinder in the housing and supported for rotation by the upper and the intermediate bearing means, said cylinder having at its upper end a hollow drive shaft rotatable with the cylinder, a fixed head for the upper end of the housing, and having therein a bore constantly in fluid communicating relationship with the hollow interior of the drive shaft, said cylinder being spaced from the inner wall of the housing and having in the wall thereof a refilling port, a piston within the cylinder including valve means placing the cylinder interior in fluid communication with the housing interior upon each down-stroke of the piston, while upon each up-stroke of the piston said valve means terminates said fluid communicating relationship and closes the refilling port of the cylinder, shaft coupling means intermediate the piston and the upper end of the driven shaft for imparting linear movement to the piston upon relative rotation of the driven shaft and the drive shaft in the presence of a load opposing rotation of the driven shaft, whereby the fluid in the cylinder is forced through the hollow drive shaft and into the bore of the head, and means actuated by the fluid pressure thereby produced in the head bore, for indicating comparative resistances to rotation of the driven shaft offered by the plastic substance in which the lower end of the shaft is immersed.

7. Apparatus for indicating the wetness or stiffness of plastic semi-solid substance, comprising the combination of an elongated fluid-filled hollow housing having axial bearing means at its upper and lower ends, and an intermediate bearing within the housing, a rotatable driven shaft journalled in the lower bearing means and depending from the lower end of the housing, a lifting screw on the lower end of said driven shaft, and a fixed open-ended tube on the housing depending in surrounding relationship to the lifting screw, for immersion of its lower open end into a mass of the plastic substance, said tube having a constricted orifice near the closed upper end thereof for extrusion of plastic substance lifted into the tube by the screw, a hollow fluid-filled cylinder in the housing and supported for bodily rotation by the upper and intermediate bearing means, said cylinder having at its upper end a hollow drive shaft rotatable with the cylinder, a fixed head for the upper end of the housing, and having therein a bore constantly in fluid communicating relationship with the hollow interior of the drive shaft, said cylinder being spaced from the inner wall of the housing and having in the wall thereof a refilling port, a piston within the cylinder including valve means placing the cylinder interior in fluid communication with the housing interior upon each down-stroke of the piston, while upon each up-stroke of the piston said valve means terminates said fluid communicating relationship and closes the refilling port of the cylinder, shaft coupling means intermediate the piston and the upper end of the driven shaft for imparting linear movement to the piston upon relative rotation of the driven shaft and the drive shaft in the presence of a load opposing rotation of the lifting screw within the surrounding tube, whereby the fluid in the cylinder is forced through the hollow drive shaft and into the bore of the head, and means actuated by the fluid pressure thereby produced in the head bore, for indicating comparative resistances to rotation of the lifting screw as the screw advances the plastic substance continuously through the surrounding tube.

8. Apparatus for indicating the wetness or stiffness of plastic semi-solid material contained within a receptacle, comprising the combination of an open-ended upright tube and means for supporting the tube, a lifting screw within the tube and extending substantially to the open lower end of the tube for immersion bodily with the tube into the plastic material of the receptacle, means providing a constricted orifice in the tube remote from the open end thereof, for extruding material advanced thereto through the tube by rotation of the lifting screw, means for rotating said screw at a substantially constant rate of speed, and an indicator adjacent to the constricted orifice for indicating the extrusion pressure generator by the lifting screw within the surrounding tube.

9. Apparatus for indicating the wetness or stiffness of plastic semi-solid substance, comprising the combination of an elongated hollow housing having bearing means therein, a rotatable driven shaft journalled in said bearing means and depending from the lower end of the housing, means near the lower end of said driven shaft for immersion in the plastic substance to offer resistance to rotation of said shaft, a hollow fluid-filled cylinder supported within the housing for rotational movement, said cylinder having an open upper end providing an exit for fluid contained therein, a piston within the cylinder adapted upon reciprocation to force the cylinder fluid through the exit aforesaid, means for bodily rotating the cylinder at a substantially constant rate of speed, a coupling means intermediate the piston and the upper end of the driven shaft, and including means for imparting linear movement to the piston upon relative rotation of the driven shaft and the cylinder in the presence of a load imposed upon the immersed means by the plastic substance, said linear movement of the piston being in a direction such as to displace a portion of the cylinder fluid through the exit at the open upper end of the cylinder, and indicator means actuated by the fluid so displaced, for indicating comparative resistance to rotation of the driven shaft imposed by the plastic substance upon the immersed means aforesaid.

10. Apparatus for indicating the wetness or stiffness of plastic semi-solid substance, comprising the combination of an elongated hollow housing having bearing means therein, a rotatable driven shaft journalled in said bearing means and depending from the lower end of the housing, means near the lower end of said driven shaft for immersion in the plastic substance to offer resistance to rotation of said shaft, a hollow fluid-filled cylinder supported within the housing for rotational movement, said cylinder having an open upper end providing an exit for fluid contained therein, a piston within the cylinder adapted upon reciprocation to force the cylinder fluid through the exit aforesaid, means for bodily rotating the cylinder at a substantially constant rate of speed, a coupling means intermediate the piston and the upper end of the driven shaft, and including means for imparting linear movement to the piston upon relative rotation of the driven shaft and the cylinder in the presence of a load imposed upon the immersed means by the plastic substance, said linear movement of the piston being in a direction such as to displace a portion of the cylinder fluid through the exit at the open upper end of the cylinder, indicator means actuated by the fluid so displaced, for indicating comparative resistances to rotation of the driven shaft imposed by the plastic substance upon the immersed means aforesaid, a fluid reservoir in the elongated hollow housing surrounding the cylinder, and means adapted to place the reservoir in fluid communicating relationship with the interior of the cylinder, in the absence of resistance to rotation of the driven shaft.

11. Apparatus for indicating the wetness or stiffness of plastic semi-solid substance, comprising the combination of an elongated hollow housing containing a dense fluid, bearing means within said housing, a rotatable driven shaft journalled in said bearing means and depending from the lower end of the housing, means near the lower end of the driven shaft for immersion in the plastic substance to offer resistance to rotation of said shaft, a hollow fluid-filled cylinder supported within the housing for rotational movement, said cylinder having fixed at its upper end a hollow drive shaft, means for rotating the drive shaft and the cylinder at a substantially constant speed, a fixed head for the upper end of the housing, and having therein a passage constantly in fluid communicating relationship with the interior of the drive shaft and the cylinder, said cylinder being spaced from the inner wall of the housing and having in the wall thereof a refilling port, a piston within the cylinder so related to said port as to place the cylinder interior in fluid communication with the housing interior upon each down-stroke of the piston, while upon each up-stroke thereof the piston covers said port and terminates said fluid communicating relationship, shaft coupling means intermediate the piston and the upper end of the driven shaft, including means to impart linear movement to the piston upon relative rotation of the driven shaft and the piston in the presence of a load imposed upon the immersed means by the plastic substance, said linear movement being in a direction such as to displace a portion of the cylinder fluid through the hollow drive shaft and into the passage of the head, and indicator means actuated by the fluid so displaced through the head passage, for indicating comparative resistances to rotation of the driven shaft imposed by the plastic substance upon the immersed means aforesaid.

12. Apparatus for indicating the wetness or stiffness of plastic semi-solid substance, comprising the combination of an elongated hollow housing having bearing means therein, a rotatable driven shaft journalled in said bearing means and depending from the lower end of the housing, a lift screw for plastic substance located at the lower end of said driven shaft for immersion in the plastic substance, and a cylindrical casing fixed to the housing in surrounding relationship with the lift screw, said casing having an upper discharge orifice, and an open lower end to be immersed with the screw, a hollow cylinder containing a dense fluid, and supported within the housing for rotational movement, said cylinder having an open upper end providing an exit for fluid contained therein, a piston within the cylinder adapted upon reciprocation to force the cylinder fluid through the exit aforesaid, means for bodily rotating the cylinder at a substantially constant rate of speed, means operative as the cylinder is rotated, for imparting linear movement to the piston upon relative rotation of the driven shaft and the cylinder in the presence of a load imposed upon the lift screw by the plastic substance, said linear movement of the piston being in a direction such as to displace a portion of the cylinder fluid through the exit at the open upper end of the cylinder, and indicator means actuated by the fluid so displaced, for indicating comparative resistances to rotation of the lift screw while immersed in the plastic substance.

13. Apparatus for indicating the wetness or stiffness of plastic semi-solid substance, comprising the combination of an elongated hollow housing having bearing means therein, a rotatable driven shaft journalled in said bearing means and depending from the lower end of the housing, a lift screw for plastic substance located at the lower end of said driven shaft for immersion in the plastic substance, and a cylindrical casing fixed to the housing in surrounding relationship with the lift screw, said casing having an upper discharge orifice, and an open lower end to be immersed with the screw, a hollow cylinder containing a dense fluid, and supported within the housing for rotational movement, said cylinder having an open upper end providing an exit for fluid contained therein, a piston within the cylinder adapted upon reciprocation to force the cylinder fluid through the exit aforesaid, means for bodily rotating the cylinder at a substantially constant rate of speed, means operative as the cylinder is rotated, for imparting linear movement to the piston upon relative rotation of the driven shaft and the cylinder in the presence of a load imposed upon the lift screw by the plastic substance, said linear movement of the piston being in a direction such as to displace a portion of the cylinder fluid through the exit at the open upper end of the cylinder, indicator means actuated by the fluid so displaced, for indicating comparative resistances to rotation of the lift screw while immersed in the plastic substance, and a gauge at the upper discharge orifice of the lift screw casing, for indicating the pressure of extrusion occurring as the screw forces the plastic substance continuously through said orifice.

14. Apparatus for indicating the wetness or stiffness of plastic semi-solid substance, comprising the combination of an elongated hollow housing having bearing means therein, a rotatable driven shaft journalled in said bearing means and depending from the lower end of the housing, a lift screw for plastic substance located at the lower end of said driven shaft for immersion in the plastic substance, and a cylindrical casing fixed to the housing in surrounding relationship with the lift screw, said casing having an upper discharge orifice, and an open lower end to be immersed with the screw, a hollow cylinder containing a dense fluid, and supported within the housing for rotational movement, said cylinder having an open upper end providing an exit for fluid contained therein, a piston within the cylinder adapted upon reciprocation to force the cylinder fluid through the exit aforesaid, means for bodily rotating the cylinder at a substantially constant rate of speed, means operative as the cylinder is rotated, for imparting linear movement to the piston upon relative rotation of the driven shaft and the cylinder in the presence of a load imposed upon the lift screw by the plastic substance, said linear movement of the piston being in a direction such as to displace a portion of the cylinder fluid through the exit at the open upper end of the cylinder, indicator means actuated by the fluid so displaced, for indicating comparative resistances to rotation of the lift screw while immersed in the plastic substance, a fluid reservoir in the elongated hollow housing, and means to place the reservoir in fluid replenishing connection with the interior of the cylinder whenever resistance to rotation of the driven shaft is absent.

15. Apparatus for indicating the wetness or stiffness of plastic semi-solid substance, comprising the combination of a hollow housing, and a rotatable motor driven shaft operating at constant speed and extending from the housing, a lift screw for plastic substance located at the lower end of said driven shaft, a cylindrical casing fixed to the housing and extending therefrom along the length of the lift screw, said casing having an upper end provided with a constricted orifice for the discharge of plastic substance packed into the upper end of the casing by the action of the lift screw, the lower end of the screw casing being open for immersion in the plastic substance whereby the lift screw is subjected to contact with the plastic substance substantially concurrently with immersion of the open lower end of the lift screw casing, and means for indicating comparative resistances to rotation of the lift screw as the plastic substance is extruded through the constricted orifice of the lift screw casing.

16. Apparatus for indicating the wetness or stiffness of plastic semi-solid substance, comprising the combination of a hollow housing, and a rotatable motor driven shaft operating at constant speed and extending from the housing, a lift screw for plastic substance located at the lower end of said driven shaft, a cylindrical casing fixed to the housing and extending therefrom along the length of the lift screw, said casing having an upper end provided with a constricted orifice tube for the discharge of plastic substance packed into the upper end of the casing by the action of the lift screw, the lower end of the screw casing being open for immersion in the plastic substance whereby the lift screw is subjected to contact with the plastic substance substantially concurrently with immersion of the open lower end of the lift screw casing, and an indicator of pressure applied to the orifice tube for indicating resistance to continuous flow occurring incident to sustained operation of the screw.

17. Apparatus for indicating the wetness or stiffness of plastic semi-solid substance, comprising the combination of a hollow housing, and a rotatable motor driven shaft operating at constant speed and extending from the housing, a lift screw for plastic substance located at the lower end of said driven shaft, a cylindrical casing fixed to the housing and extending therefrom along the length of the lift screw, said casing having an upper end provided with a constricted orifice for the discharge of plastic substance packed into the upper end of the casing by the action of the lift screw, the lower end of the screw casing being open for immersion in the plastic substance whereby the lift screw is subjected to contact with the plastic substance substantially concurrently with immersion of the open lower end of the lift screw casing, and means for continuously indicating the torque of the motor driven shaft as resistance to rotation of the lift screw is imposed by the plastic substance within the immersed casing.

18. Apparatus for indicating the wetness or stiffness of plastic semi-solid substance, comprising the combination of a hollow housing, and a rotatable shaft supported by said housing with one end of the shaft extended from the housing, a constant speed motive means for rotating said shaft, a lift screw for plastic substance located at the lower end of the shaft, a cylindrical casing fixed to the housing and extending therefrom along the length of the lift screw, said casing having an upper end including a constricted orifice for the discharge of plastic substance packed into the upper end of the casing by the action of the lift screw, the lower end of the screw casing being unrestrictedly open for immersion in the plastic substance whereby the screw is readily subjected to contact with the plastic substance substantially concurrently with immersion of the lower end of the lift screw casing, means intermediate the constant speed motive means and the shaft of the lift screw, for compressing a fluid in correspondency with variations of torque imposed by passage of plastic substance through the constricted orifice under the impelling force of the lift screw, and an indicator arranged to indicate the pressure applied to said fluid during operation of said screw.

19. Apparatus for indicating the wetness or stiffness of plastic semi-solid substance, comprising the combination of a hollow housing, and a rotatable shaft supported by said housing with one end of the shaft extended from the housing, a constant speed motive means for rotating said shaft, a shear member located at the lower end of the shaft and exposed for immersion in plastic semi-solid substance, to offer resistance to rotation of the shaft when the shear member is so immersed, means intermediate the constant speed motive means and the shaft carrying the shear member, for compressing an isolated static fluid in correspondency with variations of torque imposed by resistance to rotation of the shear member immersed in the plastic substance, and an indicator actuated by the variations of the fluid pressure during movement of the shear member through the plastic substance.

20. Apparatus for indicating the wetness or stiffness of plastic semi-solid substance, comprising the combination of a hollow housing, and a rotatable shaft supported by said housing with one end of the shaft extended from the housing, a constant speed motive means for rotating said shaft, a shear member located at the lower end of the shaft and exposed for immersion in plastic semi-solid substance, to offer resistance to rotation of the shaft when the shear member is so immersed, means including an axially extendable coupler interposed intermediate the constant speed motive means and the shaft carrying the shear member, for compressing an isolated static fluid in correspondency with variations of torque imposed by resistance to rotation of the shear member immersed in the plastic substance, and an indicator actuated by the variations of the fluid pressure during movement of the shear member through the plastic substance.

ERNEST A. HAGY.

CERTIFICATE OF CORRECTION.

Patent No. 2,339,991.  January 25, 1944.

ERNEST A. HAGY.

It is hereby certified that error appears in the printed specification of the above numbered patent requiring correction as follows: Page 5, first column, line 33, claim 8, for "generator" read --generated--; and that the said Letters Patent should be read with this correction therein that the same may conform to the record of the case in the Patent Office.

Signed and sealed this 21st day of March, A. D. 1944.

Leslie Frazer

(Seal)  Acting Commissioner of Patents.